United States Patent
Kracke

(10) Patent No.: US 8,517,314 B2
(45) Date of Patent: Aug. 27, 2013

(54) ACTUATOR ARRANGEMENT

(75) Inventor: Jeremy Alan George Kracke, Staffordshire (GB)

(73) Assignee: Goodrich Actuation Systems Limited, Solihull (GB)

( * ) Notice: Subject to any disclaimer, the term of this patent is extended or adjusted under 35 U.S.C. 154(b) by 430 days.

(21) Appl. No.: 12/830,739

(22) Filed: Jul. 6, 2010

(65) Prior Publication Data

US 2011/0006155 A1   Jan. 13, 2011

(30) Foreign Application Priority Data

Jul. 7, 2009 (GB) .................................. 0911733.4
Oct. 9, 2009 (GB) .................................. 0917674.4

(51) Int. Cl.
*B64C 3/50* (2006.01)
*B64C 13/28* (2006.01)

(52) U.S. Cl.
USPC ........................................ 244/214; 244/99.3

(58) Field of Classification Search
USPC ................ 244/211–217, 99.2, 99.3
See application file for complete search history.

(56) References Cited

U.S. PATENT DOCUMENTS

| | | | | |
|---|---|---|---|---|
| 2,524,605 A | * | 10/1950 | Servanty | 244/216 |
| 2,899,152 A | * | 8/1959 | Weiland | 244/226 |
| 4,470,569 A | * | 9/1984 | Shaffer et al. | 244/214 |
| 5,651,513 A | * | 7/1997 | Arena | 244/99.3 |
| 5,823,471 A | * | 10/1998 | Dazet | 244/99.3 |
| 5,836,550 A | * | 11/1998 | Paez | 244/214 |
| 6,010,097 A | | 1/2000 | Cox | |
| 7,063,292 B2 | | 6/2006 | Perez-Sanchez | |
| 7,264,206 B2 | | 9/2007 | Wheaton et al. | |
| 7,484,694 B2 | * | 2/2009 | Perez-Sanchez | 244/214 |
| 8,104,710 B2 | * | 1/2012 | Harvey et al. | 244/99.2 |
| 2009/0001224 A1 | | 1/2009 | Perez-Sanchez | |
| 2009/0134281 A1 | * | 5/2009 | Engelbrecht et al. | 244/215 |

FOREIGN PATENT DOCUMENTS

| | | |
|---|---|---|
| EP | 1985893 | 10/2008 |
| GB | 2362363 | 11/2001 |

OTHER PUBLICATIONS

European Search Report for Application No. 10 251 202.7 dated Apr. 26, 2012.

* cited by examiner

*Primary Examiner* — Joseph W Sanderson
(74) *Attorney, Agent, or Firm* — Andrus, Sceales, Starke & Sawall, LLP

(57) ABSTRACT

An actuator for use in driving the leading edge slats or other control surfaces of an aircraft includes a carrier element which is translatable and angularly moveable about a first fixed axis relative to an aircraft wing structure, an actuator arm pivotally mounted to the carrier element, and a support arm pivotally mounted to the wing structure about a second, fixed pivot axis, such that the first and second fixed axes are not perpendicular to one another.

15 Claims, 6 Drawing Sheets

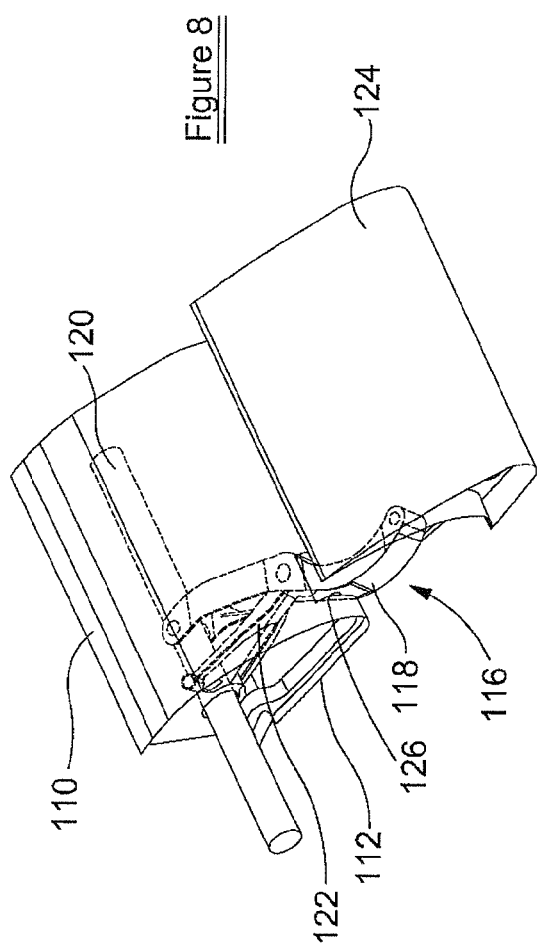
Figure 8
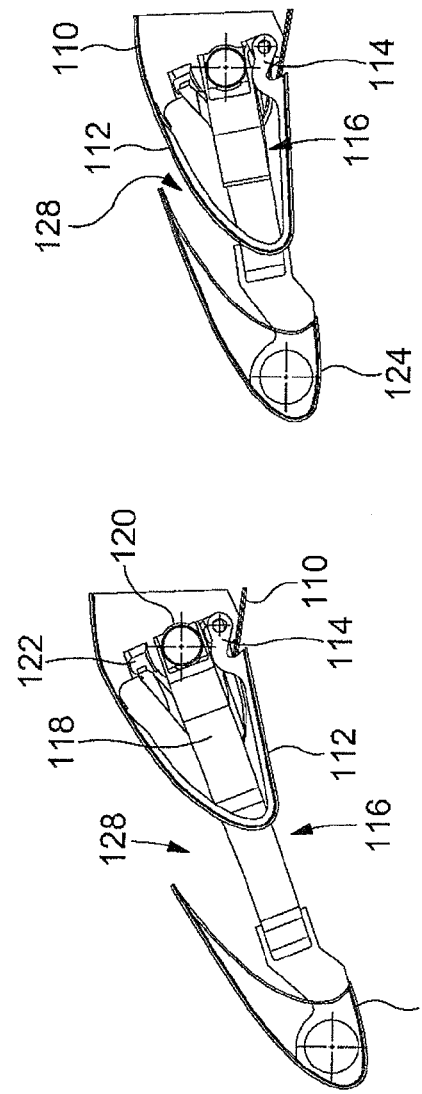
Figure 9
Figure 10
Figure 11

ACTUATOR ARRANGEMENT

BACKGROUND OF THE INENTION

This invention relates to an actuator arrangement and in particular to an actuator arrangement suitable for use in driving the leading edge slats or other control surfaces of an aircraft wing for movement between a fully retracted or stowed position and a fully extended or deployed position.

One common actuator arrangement for use in such applications includes a toothed rack or track, the teeth of which mesh with the teeth of a rotatable, motor driven pinion mounted upon a drive shaft. The drive shaft and pinion gear are mounted for rotation on the aircraft wing, and the track is secured to the leading edge slat. It will be appreciated that rotation of the pinion gear drives the track, and associated slat, for movement relative to the wing, thus permitting the slat to be moved between stowed and deployed positions. The track is typically of part circular, curved form, creating a virtual hinge line below the level of the wing, and is supported in such a manner as to guide the slat so that the slat follows a curved path of movement around the virtual hinge line when travelling between its stowed and deployed positions.

It will be appreciated that, when stowed, the track extends a considerable distance into the wing and, typically, in order to accommodate the track, openings are formed through a front spar of the wing to allow the track to extend into the wing. Often, the track is accommodated in a section of the wing that contains a fuel tank, and so relatively complex sealing arrangements have to be provided in order to prevent the escape of fuel. For example, a track can may be provided immediately behind the front spar, within the fuel tank, into which at least part of the track can be moved. In such an arrangement, the track can is sealed to the front spar/fuel tank to prevent leakage of fuel from the fuel tank at this point. The cost, complexity and quality issues associated with such an arrangement are undesirable.

Increasingly, composite materials are being used in the construction of aircraft wings. Where the front spar of the aircraft wing is manufactured from a composite material, the formation of openings therein, for example to allow the movement of the track of a slat, is undesirable as the provision of such openings significantly weakens the front spar. The need to accommodate the provision of openings therein whilst maintaining sufficient strength places severe restrictions on the design of front spar.

SUMMARY OF THE INVENTION

It is an object of the invention to provide an actuator arrangement suitable for use in moving a leading edge control surface, the actuator arrangement being of compact form so as to permit it to be accommodated within a leading edge structure of a wing, without needing to pass through the front spar, whilst permitting the control surface to be moved through a desired, arcuate, path or movement.

U.S. Pat. No. 6010097 describes an actuator arrangement for use in controlling the movement of a trailing edge wing flap, the actuator arrangement taking the form of a scissor linkage and a separate complex hinge design controlling the path of movement of the wing flap. The actuator arrangement is relatively complex, heavy and bulky, and so is unsuitable for use in leading edge applications in which less space is available to accommodate the actuator arrangement. Further, the path of movement achievable by such an actuator arrangement does not meet the current requirements of a leading edge system, particularly with regard to ensuring that there is a relatively small aperture or gap between the leading edge control surface and the wing structure when the control surface is fully deployed.

U.S. Pat. No. 7,264,206 describes an actuator arrangement for use in controlling the movement of a leading edge control surface of an aircraft wing. The arrangement takes the form of a rather complex, multi-part linkage system operable to drive the control surface, which is pivotally mounted to the wing structure, between a stowed position and a deployed position. The pivotal movement of the control surface to the wing structure prevents the control surface from being driven through the currently preferred arcuate path of movement.

According to the present invention there is provided an actuator arrangement comprising a carrier element which is translatable and angularly moveable about a first fixed axis, in use, relative to a wing structure, an actuator arm pivotally mounted to the carrier element, and a support arm pivotally mounted, in use, to the wing structure about a second, fixed pivot axis, wherein the first and second fixed axes are not perpendicular to one another.

A mounting arrangement may be provided connecting the support arm to the actuator arm and allowing at least two axes of pivotal movement between the actuator and support arms.

The mounting arrangement preferably connects the support arm to a mid-point of the actuator arm.

A free end of the actuator arm is preferably mounted to a leading edge control surface, in use.

With such an arrangement, axial movement of the carrier element drives the actuator arm and support arm for pivotal movement, resulting in displacement of the control surface. The relative orientations of the first and second fixed axes results in the movement of the control surface following an arcuate, rather than linear, path, such movement being accommodated by angular movement of the carrier element and movement of the mounting arrangement. The actuator arrangement is relatively compact and is of relatively simple, low weight form, and so is relatively easy to accommodate on an aircraft wing, not requiring the formation of openings in the front spar of the wing. Consequently, it is suitable for use on wings constructed from composite materials without requiring complex front spar designs to be used, and avoids the need to have track can or similar components installed and sealed in the fuel tank.

Preferably, the actuator arm projects, in use, through an opening in the wing structure, the actuator arm being shaped, in the region that projects through the wing structure, so as to be of curved form, the curvature being selected, relative to the path of movement of that part of the actuator arm, so as to allow the opening to be of reduced dimensions.

Preferably the opening is located so as to be closed by a leading edge slat carried by the actuator arm when the actuator arrangement is in a stowed position.

Such an arrangement is advantageous in that the need to provide a closure plate, door or other closure arrangement to close the opening, when the actuator is in a stowed condition, is reduced, thus simplifying the arrangement whilst permitting maintenance of the actuator when in a deployed condition and providing an enhancement of the aerodynamic properties of the wing structure to which the actuator arrangement is fitted. When the actuator is in a deployed condition, the reduced dimensions of the opening result in the opening forming only a relatively small disturbance to airflow.

Preferably, the shape of the actuator arm is such that a footprint of the actuator arm at the point at which it passes through the opening is substantially stationary in at least the lateral direction during movement of the actuator arm.

Preferably, the wing structure includes a droop nose structure pivotally connected to a main part of the wing structure, and wherein the droop nose structure is pivotally moveable upon angular movement of the actuator arm.

The use of droop nose structures at the leading edges of aircraft wings is well known to modify the aerodynamic properties of the wing, for example to increase lift during take off or allow the wing to operate at a higher angle of attack and hence decrease lift during landing. This is achieved by moving the droop nose structure relative to the main wing structure to modify the overall profile of the wing to increase camber whilst not significantly extending the chord of the wing.

Likewise, the use of leading edge slats which can be moved relative to the main wing structure to form a slot in the overall wing structure allowing air flow to pass from the underside of the wing to the upper surface thereof, to modify the aerodynamic properties of the wing, is known.

Although both of these techniques are known, they have traditionally been viewed as alternative techniques for achieving similar results. In accordance with the invention they may be used in combination. This can allow enhancements in the aerodynamic performance of the wing structure.

The actuator arm may project through an opening formed in the droop nose structure, cooperation between the actuator arm and the droop nose structure supporting the droop nose structure, such that angular movement of the actuator arm about the first axis is accompanied by pivotal movement of the droop nose structure. Sliding bearings or other bearing arrangements may be provided to reduce wear between the droop nose structure and the actuator arm. Of course, it will be appreciated that other techniques may be used to guide and support the droop nose structure and drive the droop nose structure for movement.

Such an arrangement is beneficial in that the opening in the droop nose structure may be of reduced dimensions. Further, the advantages outlined hereinbefore of using a droop nose structure in combination with a leading edge slat are maintained.

The actuator arm may, as outlined hereinbefore, be of curved form (at least in the region that projects through the opening, in use) to permit further reductions in the dimensions of the opening to be made by ensuring that the footprint of the actuator arm at the point at which it passes though the opening is substantially stationary.

The invention further relates to a wing arrangement comprising an actuator arrangement of the type defined hereinbefore mounted to a wing structure, and a leading edge control surface, for example in the form of a slat, mounted to the actuator arm of the actuator arrangement. Preferably, several actuator arrangements are provided, driven by a common drive line. For example, each control surface may have two or more actuator arrangements associated therewith, and/or a plurality of control surfaces may be driven for movement by the common drive line, with the common drive line linking the carrier elements of each actuator arrangement.

According to another aspect of the invention there is provided a wing structure comprising a main wing structure, a droop nose structure pivotally mounted to the main wing structure, a leading edge slat moveably mounted to the main wing structure, and drive means operable to drive the leading edge slat for movement between stowed and deployed positions, and for driving the droop nose structure for pivotal movement.

BRIEF DESCRIPTION OF THE DRAWING

The invention will further be described, by way of example, with reference to the accompanying drawings, in which:

FIG. 8 is a view illustrating an actuator arrangement in accordance with another embodiment of the invention;

FIGS. 9 to 11 are views illustrating the arrangement of FIG. 8 in fully deployed, intermediate and stowed positions.

DETAILED DESCRIPTION OF THE PREFERRED EMBODIMENTS

Figure 1:
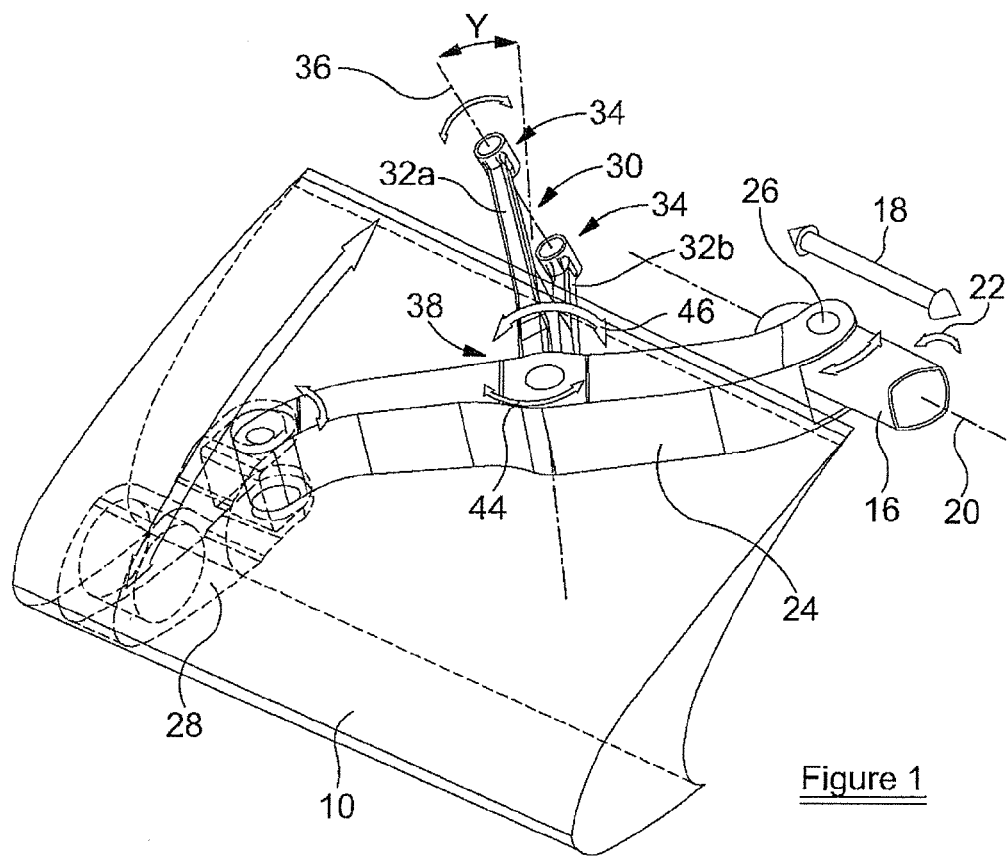
FIG. 1 is a diagrammatic perspective view illustrating an actuator arrangement in accordance with one embodiment of the invention.

Referring to FIGS. 1 to 7 of the accompanying drawings, an actuator arrangement for use in driving a leading edge control surface in the form of a slat 10 for movement relative to a wing structure 12 including a front spar 14 and a series of spars 15 running along the chord of the wing, commonly referred to as D-nose ribs is illustrated. The actuator arrangement comprises a carrier element 16, conveniently of hollow form, which extends along the length of the wing, within a lead edge structure ahead of the front spar 14 and passing through openings formed in the D-nose ribs 15. The carrier element 16 is supported in such a manner as to permit it to translate in its lengthwise direction (as denoted by arrow 18 in FIG. 1) and to move, angularly, about its axis 20 (as denoted by arrow 22 in FIG. 1). A drive arrangement (not shown) is provided to drive the carrier element 16 for translational movement. For example, a ball screw actuator or other linear actuator may be used. It will be appreciated, however, that a number of other drive arrangements may be used, and some particularly suitable drive arrangements are described in British Patent Application numbers 0917693.4 and 1009742.6. Conveniently, the drive arrangement could include appropriate no-back and/or brake functionality to prevent un-commanded movement of the carrier element 16 and hence the slat 10. Although the drive arrangement is operable to move the carrier element 16 for translational movement, it does not directly control or change the angular position of the carrier element 16.

Pivotally connected to the carrier element 16 is an end part of an actuator arm 24, the pivotal connection being achieved by means of a pivot pin 26. The opposite end of the actuator arm 24 is pivotally connected to the slat 10 by means of a mounting 28. In use, significant twisting loads will be experienced at the point at which the actuator arm 24 is connected to the slat 10, and the mounting 28 is designed to accommodate these loads.

Figure 2:
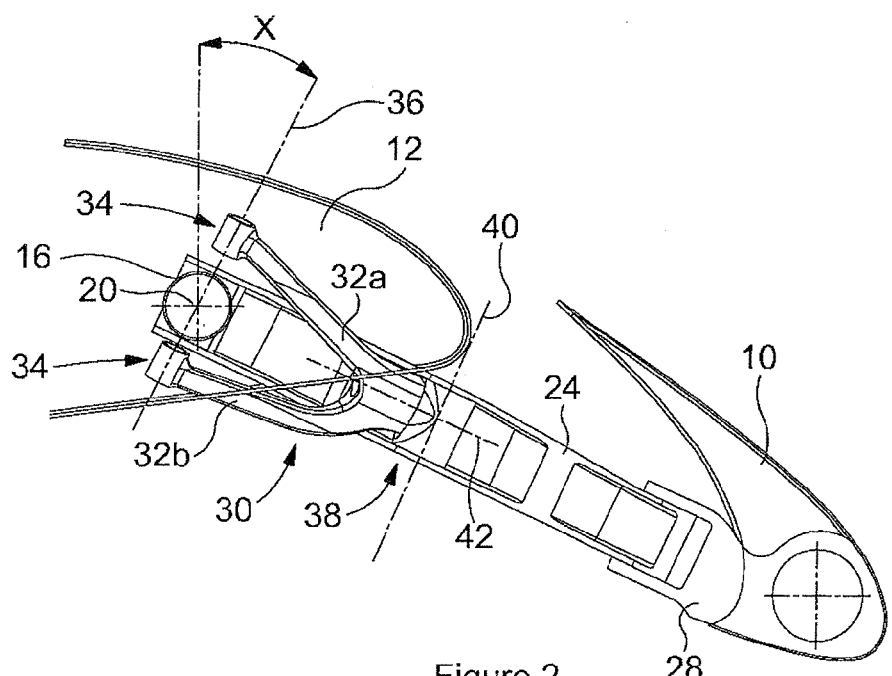
FIG. 2 is a diagrammatic side view illustrating the arrangement of FIG. 1.

A support arm 30 is pivotally mounted upon the wing structure 12, the support arm 30 being of bifurcated form including upper and lower limbs 32a, 32b which terminate at knuckles 34 through which respective pivot pins (not shown) extend, in use, to secure the support arm 30 to the wing structure 12 for pivoting movement about a fixed pivot axis 36. The carrier element 16 passes between the limbs 32a, 32b, and the support arm 30 is positioned such that the pivot axis 36 about which the support arm 30 is pivotally mounted to the wing structure 12 passes through the centre line or axis 20 of the carrier element 16, but there is no direct physical connection between the carrier element 16 and the support arm 30. Further, as best seen in FIG. 2, the pivot axis 36 and the axis 20 of the carrier element 16 are not perpendicular to one another. Rather, as illustrated, the pivot axis 36 is angled to a lateral plane along the axis 20 of the carrier element 16 by an angle X, which for example is in the range of 26° to 28°, and is also angled to a wing chord plane perpendicular to the lateral plane by an angle Y, as illustrated in FIG. 1, which for example is in the range 9° to 10°. However, it will be appreciated that the invention is not restricted to these specific angles, and that the selection of these angles determines, in part, the path of movement followed by the slat. As a result, regardless as to the angular position of the carrier element 16, the pivot axis 36 and the axis about which the actuator arm 24 is connected to the carrier element 16 are never parallel, and consequently the arcuate paths of movement of the actuator arm 24 and the support arm 30 as they undergo their respective pivotal movements do not lie in the same plane as one another, but rather will always lie in planes angled to one another.

The support arm 30 is connected to the actuator arm 24 at a point approximately midway along the length of the actuator arm 24 by a mounting arrangement 38. The mounting arrangement 38 permits angular movement to occur between the support arm 30 and the actuator arm 24 about two perpendicular pivot axes 40, 42, thus allowing relative angular movement to occur therebetween in the directions of the arrows 44, 46 in FIG. 1, in use.

Figure 3:
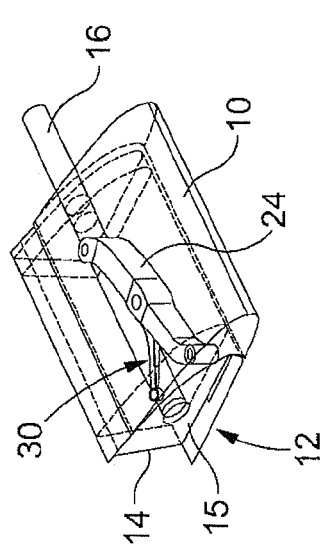
FIGS. 3 to 5 are views illustrating the arrangement of FIG. 1 in three different operating positions.

FIG. 3 illustrates the actuator arrangement in a stowed or retracted configuration, the carrier element 16 occupying a position in which the point at which it is connected to the actuator arm 24 is spaced from the axis 36 by a relatively large distance. In this configuration, the actuator arm 24 and support arm 30 lie alongside one another and alongside the carrier element 16 in a compact manner which can be accommodated relatively easily within the leading edge structure of the wing structure 12. In this configuration, the slat 10 is held in a retracted position adjacent the leading edge structure of the wing structure 12.

Figure 4:
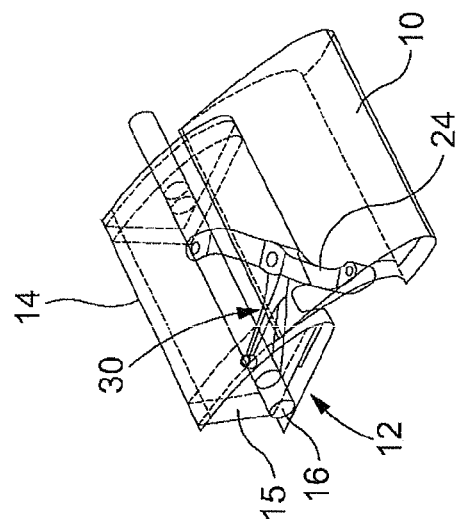
Figure 5:
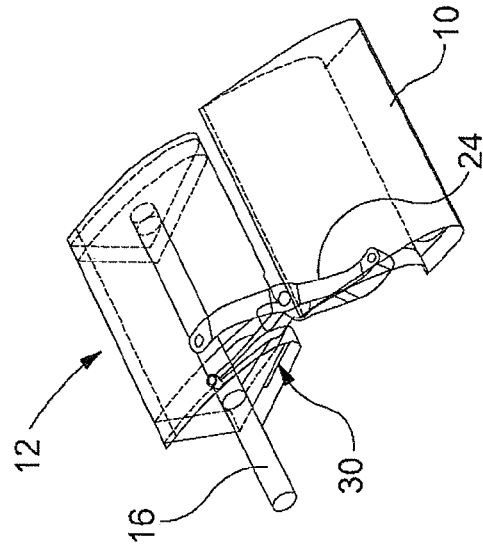

From the position shown in FIG. 3, translational movement of the carrier element 16 to move the pivotal connection between the actuator arm 24 and the carrier element 16 closer to the axis 36 results in the actuator arm 24 and the support arm 30 both undergoing pivotal movement. The pivotal movement results in the slat 10 being moved relative to the wing structure 12 towards an extended or deployed position as shown in FIGS. 4 and 5.

Figure 6:
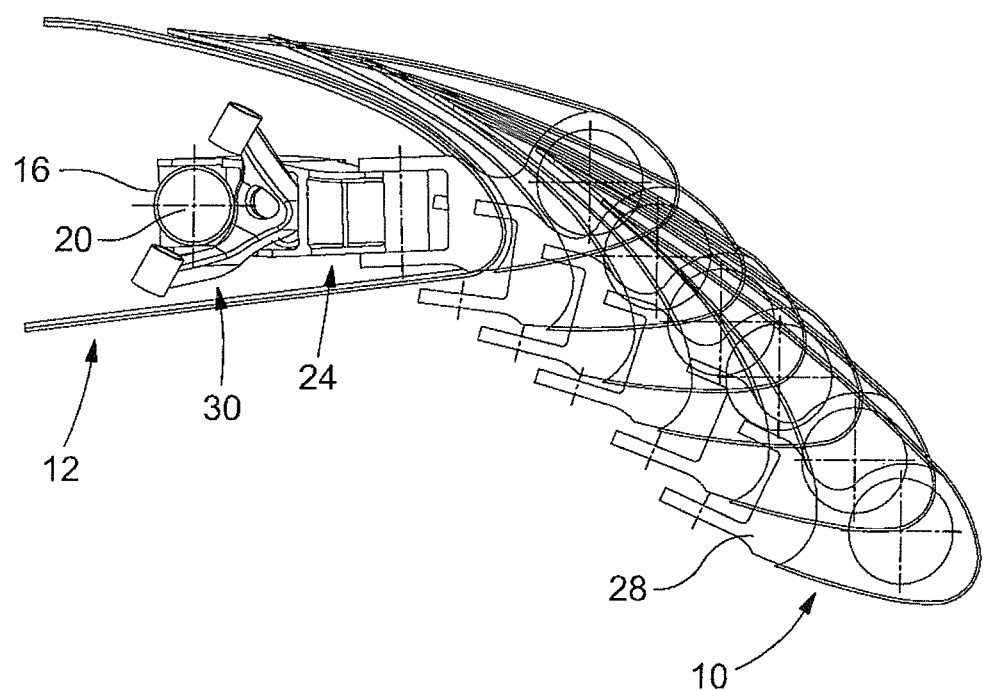
FIG. 6 is a diagrammatic side view illustrating the arcuate operation of the actuator arrangement.
Figure 7:
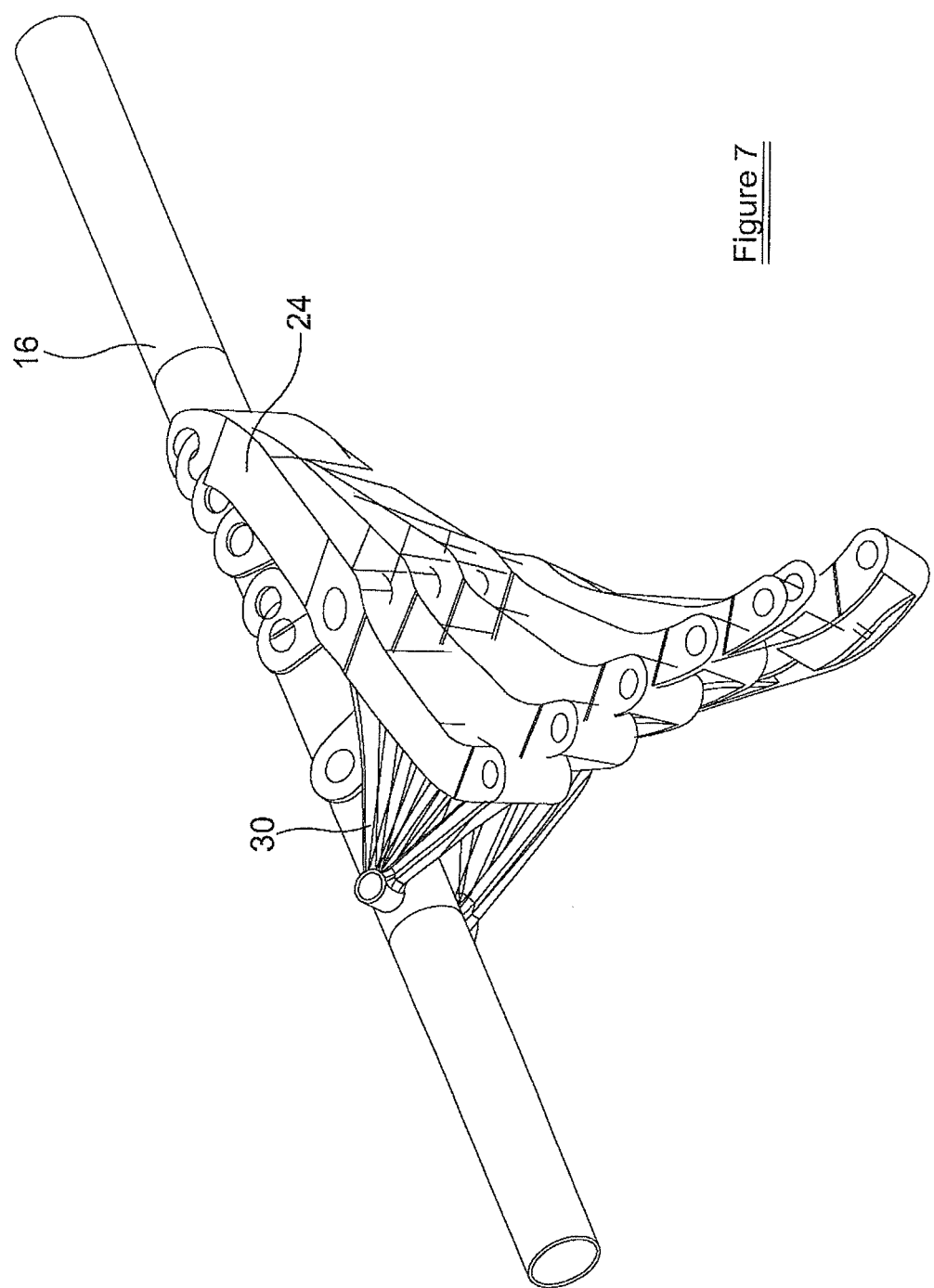
FIG. 7 is another diagrammatic view illustrating operation of the actuator arrangement.

As mentioned hereinbefore, the orientation of the axis 36 is such that it is not perpendicular to the axis 20 of the carrier element 16, and so the planes of movement of the support arm 30 and actuator arm 24 are angled to one another. The nature of the mounting arrangement 38 accommodates the resulting relative angular movement between the support arm 30 and actuator arm 24 but, in so doing, requires the actuator arm 24 to undergo pivotal movement about the axis 20 of the carrier element 16 which is permitted by angular displacement of the carrier element 16 about its axis 20. It will thus be appreciated that the slat 10 not only moves forwardly away from the leading edge structure of the wing structure 12, but also moves in a vertical, downward direction during such forward movement, the net effect being that the slat 10 follows an arcuate path of movement as shown in FIG. 6 (which shows the slat 10 in a series of positions), with the angle of attack of the slat 10 increasing during this movement. The path of movement of the slat 10 is relatively steep, as required in many leading edge applications. FIG. 7 illustrates several points in the movement of the actuator arrangement, clearly showing the shaft 16 pivoting about the axis 20, resulting in corresponding pivotal movement of the actuator arm 24 about the axis 20, as the carrier element 16 moves longitudinally, the axis 36 about which the support arm 30 pivots, in use, remaining fixed in the longitudinal direction during this movement.

Return movement is achieved by driving the carrier element 16 for translational movement in the opposite direction. Such movement returns the slat 10 back to its stowed position following the same path of movement.

It will be understood that the actuator arrangement of the invention is advantageous in that it is of relatively simple and compact form, and so can be accommodated within the lead edge structure of an aircraft wing, without requiring the provision of openings passing through the front wing spar. The simplicity of the design results in it being of relatively low weight, yet permits the leading edge control surface with which it is used to follow a desirable path of movement. Furthermore, this design ensures that there is a relatively small gap between the leading edge control surface and the wing structure when the control surface is fully deployed providing a relatively clean surface for airflow over the leading edge of the wing, a key requirement for an aircraft high lift system.

As the formation of openings in the front spar 14 is avoided, the actuator arrangement of the invention is suitable for use with aircraft wings formed using composite materials, although it will be appreciated that the invention is not restricted to such use. The compact nature of the actuator arrangement is further advantageous in that it does not require the provision of track cans or similar components within the fuel tank, thus simplifying the design of the fuel tank.

Referring next to FIGS. 8 to 11 there is illustrated a main wing structure 110 having a false leading edge, droop nose structure 112 pivotally mounted thereto by a pivoted bracket 114. Secured to the main wing structure 110 is an actuator arrangement 116 of form very similar to that described hereinbefore, and so the nature and operation of the actuator arrangement will not be described in detail, and other than as mentioned and illustrated herein it can be taken that the structure and operation is as described hereinbefore.

The actuator arrangement 116 comprises an actuator arm 118 pivotally mounted to a carrier 120 which is axially moveable relative to the main wing structure 110. A support arm 122 is pivotally mounted to the main wing structure 110 and is connected, with three degrees of movement, to a mid point of the actuator arm 118. The actuator arrangement is such that axial movement of the carrier 120 causes the actuator and support arms 118, 122 to move as a scissor linkage, displacing a leading edge slat 124 mounted to the free end of the actuator arm 118 towards and away from the main wing structure 110. The orientations of pivot axes of the actuator and support arms 118, 122 are such that the leading edge slat 124 follows an arcuate path of movement, the actuator arm 118 tilting downwards during extending movement as shown in FIGS. 9 and 10.

The actuator arm 118 extends or projects, in use, through an opening 126 formed in the droop nose structure 112, the upper edge of the opening 126 resting upon the actuator arm 118 such that the droop nose structure 112 is supported by, and its position is dependent upon the position of, the actuator arm 118. Although not illustrated, a sliding bearing arrangement may be provided therebetween, or another mechanism provided, to avoid or reduce wear therebetween.

The part of the actuator arm 118 that projects through the opening 126 is not of straight form but rather, as best shown in FIG. 8, is curved. The direction of curvature, and the form of the curve is shaped, relative to the path followed by the actuator arm 118 as it is moved between its stowed and deployed positions, to allow the width of the opening 126 in the droop nose structure 112 to be only slightly larger than the corresponding dimension of the actuator arm 118, the footprint of the actuator arm 118 at the point at which it passes through the opening 126 being substantially stationary during deployment. As the droop nose structure 112 is supported by, and displaces with, the actuator arm 118 in a vertical direction, it will be appreciated that the vertical dimension of the opening 126 need only be slightly greater than the corresponding dimension of the actuator arm 118.

In use, with the actuator arrangement 116 in its stowed position as shown in FIG. 11, it will be seen that the droop nose structure 112 is held in a raised position, and the leading edge slat 124 is in a stowed, retracted position in which it rests against the front of the droop nose structure 112, covering the opening 126. In this position, the overall leading edge wing structure provides a smooth, clean aerofoil profile appropriate for cruise conditions in which it is desirable to minimise drag, without requiring the provision of additional doors or cover plates, or the like, to assist in providing such a clean profile.

In the stowed position, a mounting bracket connecting the actuator arm 118 to the leading edge slat 124, which can be viewed, in effect, as an extension of the actuator arm 118, extends through the opening 126.

Deployment of the actuator arrangement 116 as outlined hereinbefore results in the leading edge slat 124 moving forwardly of the main wing structure 110, at the same time displacing downwardly, the leading edge slat 124 following an arcuate path of movement, and also results in the droop nose structure 112 moving in a pivotally downward direction. The movement of the leading edge slat 124 opens a slot 128 in the overall wing profile, allowing air flow from beneath the wing towards the upper surface thereof. Further, both the forward movement of the leading edge slat 124 and the pivoting movement of the droop nose structure 112 result in the leading edge profile, and hence the aerodynamic properties of the wing, being altered. In addition, the pivoting movement of the droop nose structure 112 allows the slot 128 formed between the leading edge slat 124 and the droop nose structure 112 to be shaped to define an optimised convergent air flow gap necessary for controlling the air flow passing through this gap and over the upper leading edge surface of the wing, commonly referred to as boundary layer control. If the nose structure were not of the droop nose form, as in the arrangement of FIGS. 1 to 7, then the shape of the air flow gap so defined would not be optimised, possibly resulting in increased turbulence and in the formation of an uncontrolled boundary layer on the upper leading edge surface of the wing, which can have a detrimental effect on the aerodynamic performance of the aircraft.

As the opening 126 is of relatively small dimensions, even when the actuator arrangement is deployed the provision of the opening has relatively little effect on the aerodynamic performance, compared to arrangements in which a larger opening would be required to accommodate the movement of the actuator arm 118.

The arrangement described hereinbefore with reference to FIGS. 8 to 11 may also be beneficial in that assembly and maintenance of a leading edge wing structure incorporating an integrated droop nose may be achieved in a more modular approach when compared with the assembly and maintenance of a leading edge structure incorporating a fixed D-nose.

Figure 12:
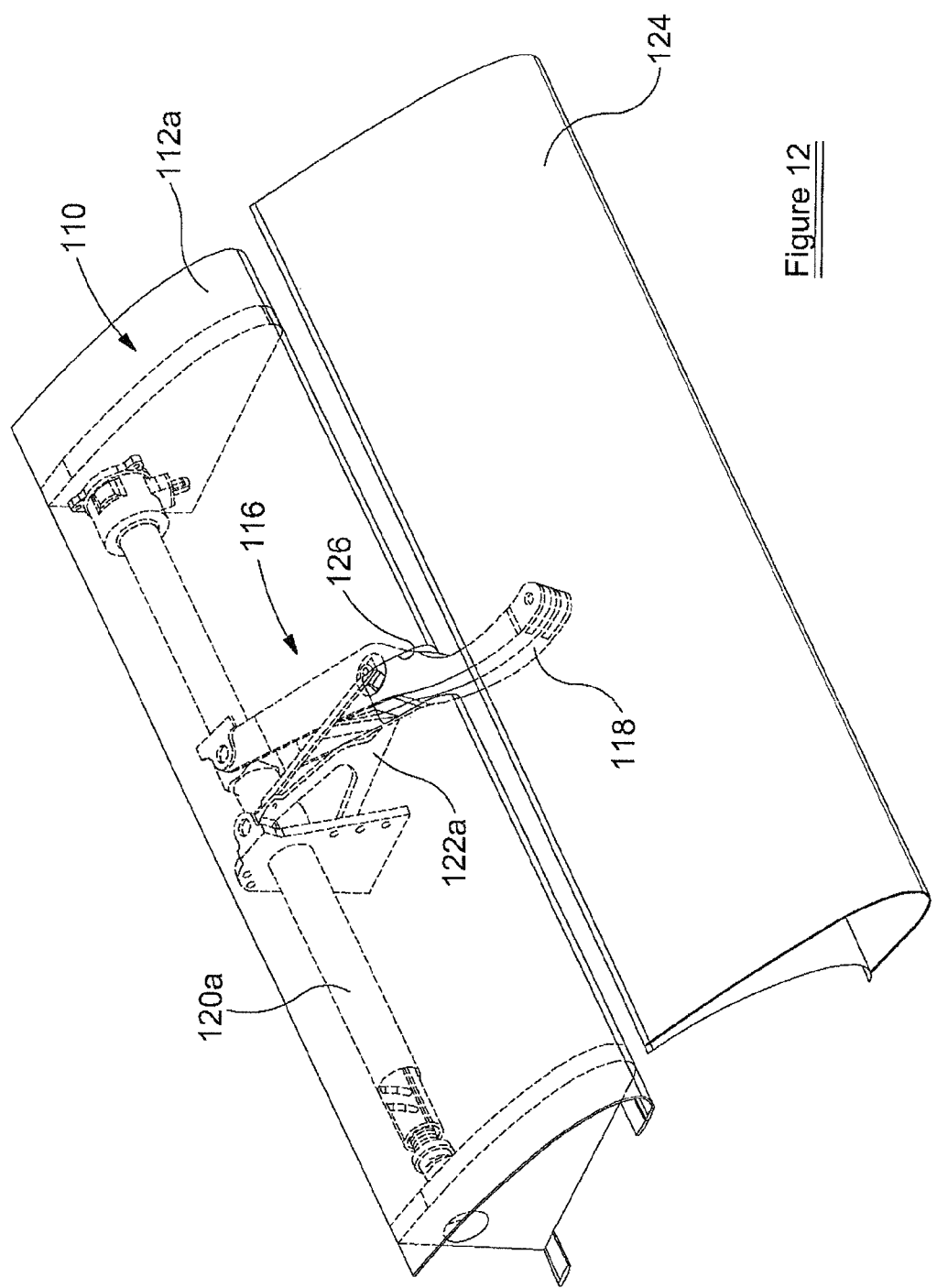
FIG. 12 is a view similar to FIG. 8 illustrating a further alternative embodiment.

FIG. 12 illustrates another alternative embodiment, the arrangement of FIG. 12 not including a droop nose structure 112. In FIG. 12, part of the support structure is omitted for clarity. In this arrangement, the D-nose leading edge 112*a* of the main wing structure 110 is fixed. However, as with the arrangement outlined hereinbefore the actuator arm 118 is of curved form to allow the opening 126 to be of reduced dimensions as outlined hereinbefore. Further modifications to the actuator arrangement are implemented in this alternative embodiment to enable the size of the opening 126 to be minimised. For instance, the location of the actuator arrangement within the D-nose leading edge 112*a*, and in particular the location of the carrier element 120*a* is altered, along with corresponding changes to the geometry of the scissor linkage and design of the support arm 122*a*, to provide a more compact arrangement and enable the opening 126 to be reduced. Although such an arrangement may not have all of the advantages of the arrangement outlined hereinbefore, at least some of the benefits still apply.

Although the description hereinbefore is of some specific embodiments of the invention, it will be appreciated that a wide range of modifications or alterations may be made thereto. Although the arrangement illustrated in FIGS. 8 to 11 has the pivoted bracket located beneath and behind the carrier 120, this positioning need not always be used. For example, the bracket could be located ahead of the carrier 120. Further, arrangements where the bracket 114 is located above, rather than below, the carrier 120, for example pivotally mounting the upper part of the droop nose structure to the main wing structure may be possible. Further, for example, rather than use a sliding bearing, other mechanisms to reduce wear between the actuator arm and the droop nose structure may be used. Indeed a different mechanism may be used to guide and/or drive the droop nose structure for movement, for example a mechanism independent of the actuator arrangement used to drive the leading edge slat may be used. Further, an alternative drive or actuator mechanism for driving and/or guiding the leading edge slat for movement may be used.

Further, rather than having one drive arrangement driving a common drive line that links all of the carrier elements associated with the actuator arrangements on the leading edge of the wing, there could be individual drive arrangements on each leading edge control surface driving the carrier elements associated with the actuator arrangements of the respective control surface.

Furthermore, although the invention is described in a leading edge slat application, it will be understood that it could be applied in the actuation of other aircraft flight control surfaces such as trailing edge flaps.

The invention claimed is:

1. An actuator arrangement comprising:
    a carrier element which is translatable along a first fixed axis and angularly moveable about the first fixed axis relative to a wing structure;
    an actuator arm pivotally mounted to the carrier element; and
    a support arm pivotally mounted to the wing structure about a second, fixed pivot axis;
    wherein the first and second fixed axes are not perpendicular to one another.

2. The actuator arrangement according to claim 1, wherein a mounting arrangement is provided connecting the support arm to the actuator arm and allowing at least two axes of pivotal movement between the actuator and the support arm.

3. An arrangement according to claim 2, wherein the mounting arrangement connects the support arm to a midpoint of the actuator arm.

4. An arrangement according to claim 1, wherein a free end of the actuator arm is mounted to a leading edge control surface, in use.

5. An arrangement according to claim 1, wherein the actuator arm projects, in use, through an opening in the wing structure, the actuator arm being shaped, in the region that projects through the wing structure, so as to be of curved form, the curvature being selected, relative to the path of movement of that part of the actuator arm, so as to allow the opening to be of reduced dimensions.

6. An arrangement according to claim 5, wherein the opening is located so as to be closed by a leading edge slat carried by the actuator aim when the actuator arrangement is in a stowed position.

7. An arrangement according to claim 5, wherein the shape of the actuator arm is such that a footprint of the actuator arm at the point at which the actuator arm passes through the opening is substantially stationary in at least the lateral direction during movement of the actuator arm.

8. An arrangement according to claim 1, wherein the wing structure includes a droop nose structure pivotally connected to a main part of the wing structure, and wherein the droop nose structure is pivotally moveable upon angular movement of the actuator arm.

9. An arrangement according to claim 8, wherein the actuator arm projects through an opening formed in the droop nose structure, cooperation between the actuator arm and the droop nose structure supporting the droop nose structure, such that angular movement of the actuator arm about the first axis is accompanied by pivotal movement of the droop nose structure.

10. An arrangement according to claim 9, wherein sliding bearings or other bearing arrangements are provided to reduce wear between the droop nose structure and the actuator arm.

11. An arrangement according to claim 9, wherein the actuator arm is of curved form at least in the region that projects through the opening, in use, so that the footprint of the actuator arm at the point at which the actuator arm passes though the opening is substantially stationary.

12. An aircraft wing comprising at least one actuator arrangement as claimed in claim 1 mounted to the wing structure, and a leading edge control surface, mounted to the actuator arm of the actuator arrangement.

13. A wing according to claim 12, wherein the wing includes several of the actuator arrangements driven by a common drive line.

14. A wing according to claim 12, wherein the wing structure includes a droop nose structure pivotally connected to a main part of the wing structure, and wherein the droop nose structure is pivotally moveable upon angular movement of the actuator arm.

15. An aircraft wing comprising an actuator arrangement as claimed in claim 1 mounted to a wing structure, the wing structure including a droop nose structure pivotally connected to a main part of the wing structure, and wherein the droop nose structure is pivotally moveable upon angular movement of the actuator arm of the actuator arrangement.

* * * * *